(12) United States Patent
Thomson

(10) Patent No.: US 10,219,618 B2
(45) Date of Patent: Mar. 5, 2019

(54) PORTABLE DESK

(71) Applicants: INTUITIVE DESIGNS (JERSEY) LTD, St Peter (JE); Wendy Thomson, St Peter (JE)

(72) Inventor: Wendy Thomson, St Peter (JE)

(73) Assignee: Intuitive Designs (Jersey) Ltd., Jersey (GB)

(*) Notice: Subject to any disclaimer, the term of this patent is extended or adjusted under 35 U.S.C. 154(b) by 0 days.

(21) Appl. No.: 15/740,703

(22) PCT Filed: Jul. 11, 2016

(86) PCT No.: PCT/GB2016/052077
§ 371 (c)(1),
(2) Date: Dec. 28, 2017

(87) PCT Pub. No.: WO2017/013396
PCT Pub. Date: Jan. 26, 2017

(65) Prior Publication Data
US 2018/0184801 A1   Jul. 5, 2018

(30) Foreign Application Priority Data

Jul. 23, 2015 (GB) .................................. 1513001.6

(51) Int. Cl.
*A47B 3/14* (2006.01)
*B62B 1/12* (2006.01)
(Continued)

(52) U.S. Cl.
CPC ............ *A47B 39/06* (2013.01); *A47B 83/008* (2013.01); *A47B 85/06* (2013.01); *B62B 1/12* (2013.01);
(Continued)

(58) Field of Classification Search
CPC ......... A47B 39/06; A47B 39/00; A47B 39/02; A47B 39/04; A47B 39/08; A47B 83/02;
(Continued)

(56) References Cited

U.S. PATENT DOCUMENTS

| 4,798,411 A | 1/1989 | Lin et al. |
| 2012/0104730 A1* | 5/2012 | Goldszer ................ B62B 1/008 |
| | | 280/651 |

(Continued)

FOREIGN PATENT DOCUMENTS

| DE | 10157602 A1 | 6/2003 |
| EP | 2409599 A1 | 1/2012 |

(Continued)

OTHER PUBLICATIONS

International Search Report issued in connection with corresponding PCT application No. PCT/GB2016/052077 dated Oct. 31, 2016.
(Continued)

*Primary Examiner* — Daniel J Rohrhoff
(74) *Attorney, Agent, or Firm* — Millman IP Inc.

(57) ABSTRACT

A portable desk (10) which comprises a main body (12), at least one wheel (18) engagable with the main body (12), and a support element (14) engagable with the main body (12) at a position which is at or adjacent to the or each wheel (12). The desk (10) can be arranged in two different configurations: in the first configuration, the main body (12) is preferably free standing and arranged such that the support element (14) is disposed at a vertically uppermost end of the main body to present a work-surface (16) to a user; whereas in the second configuration, the main body (12) is arrangeable such that the wheels (18) are in contact with the ground to allow the desk to be pushed or pulled by a user. A method
(Continued)

of converting such a portable desk into a hand-cart, and a method of converting such a portable desk into a stowable volume are also provided.

19 Claims, 8 Drawing Sheets

(51) Int. Cl.
    *A47B 39/06*     (2006.01)
    *A47B 83/00*     (2006.01)
    *A47B 85/06*     (2006.01)

(52) U.S. Cl.
    CPC ... *A47B 2003/145* (2013.01); *B62B 2206/006* (2013.01)

(58) Field of Classification Search
    CPC ......... A47B 83/008; A47B 3/14; A47B 3/063; A47B 2003/145; B65B 2206/006
    See application file for complete search history.

(56) References Cited

U.S. PATENT DOCUMENTS

| | | | |
|---|---|---|---|
| 2012/0119459 A1* | 5/2012 | Hanson | B62B 1/002 280/47.17 |
| 2014/0238799 A1* | 8/2014 | Sharma | B62B 1/125 190/11 |
| 2016/0236699 A1* | 8/2016 | Wang | B62B 3/02 |
| 2017/0326019 A1* | 11/2017 | Bramsiepe | A61H 3/04 |
| 2018/0125233 A1* | 5/2018 | Leier | A47B 13/023 |

FOREIGN PATENT DOCUMENTS

| | | |
|---|---|---|
| GB | 2266231 A | 10/1993 |
| WO | 2005046390 A2 | 5/2005 |

OTHER PUBLICATIONS

Examination Report issued in connection with corresponding GB application (GB 1513001.6) dated Feb. 21, 2017.
GB Search Report issued in connection with corresponding GB application (GB 1513001.6) dated Feb. 24, 2016.

* cited by examiner

PORTABLE DESK

The present invention relates to a portable desk for providing a user with a workspace, typically but not necessarily exclusively whilst in a location in which this would otherwise be challenging. The invention further relates to a method of converting a portable desk into a hand-cart, and also to a method of converting a portable desk into a stowable volume.

When travelling, particularly for business reasons, it can be difficult to find a location in which to comfortably work. Public spaces, such as airports, conference centres and train stations sometimes may have ample seating space, but rarely have table or desk space available for individuals to work at. With the advent of wireless communications technology, it has become more straightforward to conduct business whilst travelling, and it would be desirable for an individual to have desk space available for a laptop computer or documents, for instance.

It is, however, not feasible or becomes impractical for an individual to transport a desk with them in addition to other baggage that they may be carrying, as this would be cumbersome for the person carrying the items.

Portable and collapsible chairs and stools are well known, but such items still must be carried in addition to an individual's luggage, and such devices do not solve the problem of lack of desk- or work-space in public areas.

It is therefore an object of the present invention to provide a portable desk which doubles as a hand-cart to obviate the above problems.

According to a first aspect of the invention, there is provided a portable desk comprising a main body; at least one wheel engaged or engagable with the main body; and a support element having a user work-surface and which is engaged or engagable with the main body at or adjacent to the or each wheel; wherein, in a first configuration, the main body is arrangeable such that the support element is disposed at or adjacent to an upper end portion of the main body thereby presenting the work-surface for use by a user, and in a second configuration, the main body is inverted such that the or each wheel is in contact with the ground to allow the desk to be pushed or pulled by a user.

By providing a portable desk which can be configured as a static desk whilst having a second, mobile configuration allows a user to push or tow the desk whilst in transit, and then deploy the desk in a position where they wish to work. The support element provides a convenient work-space upon which the user could rest a laptop, for instance.

Preferably, the support element may be pivotably engagable with the main body, and may comprise a locking means for locking a pivoted position of the support element relative to the main body.

By allowing the support element to move relative to the main body, which may typically be via a pivoting motion, it becomes possible to first adjust the desk to suit the user's needs, but more critically allows the user to move the support element into a convenient position during transit when the desk is being pushed or towed.

In the second configuration, the support element may be perpendicular or substantially perpendicular to the main body, the portable desk acting as a hand-cart, and more preferably a luggage trolley, when inverted.

By providing a support element which is perpendicular or substantially so with respect to the main body, it becomes possible to place luggage thereon in such a way so as to retain the luggage during transit of the portable desk. This circumvents the issue of needing to carry both a portable desk and the individual's other possessions simultaneously; bags, suitcases or other items can be placed onto the support element in the second configuration, freeing the user's hands. In this arrangement, the transport of the desk and other items in tandem correlates with the transport of a wheeled suitcase or hand-cart. This configuration conveniently configures the portable desk into a sack truck or similar, being a substantially L-shaped box-moving hand-cart with a handle at one end, wheels at the base, and a small ledge to set objects on, flat against the floor when the inverted desk is in an upright condition.

Preferably, the support element may be cantilevered to the main body.

Allowing for a cantilevered support element allows the maximum area of the support element to be utilised as a work surface in the first, desk configuration, and a maximum area for luggage transport in the second, hand-cart configuration.

In a preferred embodiment, a seat element may be provided which is engagable with the main body. Such a seat element may be pivotably engagable with the main body, in which case, in the first configuration, the seat element may be pivoted so as to be horizontal or slightly inclined thereto, and in the second configuration, the seat element may be pivoted so as to be parallel or substantially parallel with the main body.

Whilst the desk could feasibly be utilised as a standing desk, the overall utility of the desk is dramatically increased by the inclusion of a seat which can be readily stowed adjacent to the main body of the desk. Most people traditionally work whilst seated at a desk, and the provision of a seat element with the desk allows this standard working position to be obtained whilst the individual is out of the office.

Optionally, a vertical position of the seat element on the main body may be adjustable. There may also further be a bracket connecting the seat element to the main body, the bracket being arranged to allow a distance between the seat element and main body to be adjusted, and additionally or alternatively there may be a hook on the seat element positioned so as to be usable in the first configuration.

Providing adjustability of the seat element advantageously allows the user to optimise the arrangement of the portable desk for comfort.

A seat element may include upper and lower seat portions, the lower seat portion being arranged relative to the upper seat portion to provide a back rest when unfolded, with the upper seat portion thereby forming a squab. Said upper and lower seat portions may be pivotably engagable relative to one another.

Providing a seat element which can be arranged so as to have a back rest can beneficially aid a user's posture and comfort when using the desk. By allowing the two seat portions to pivot together, the overall volume of the seat element can be minimised, better ensuring that the desk can be stowed in a relatively small volume.

Preferably, the portable desk may further comprise a handle engagable with the main body positioned distal to the or each wheel, and said handle may act as a leg and/or foot of the main body in the first configuration.

By providing a handle on the main body, a user can more easily push or tow the portable desk in its second configuration. By also utilising the handle as a leg of the main body, the number of additional legs or supports which must be provided is minimised.

A third configuration in which the support element is parallel or substantially parallel with the main body allowing the desk to be carried by the handle may also be provided.

If the support element can be pivoted into a condition where it is parallel with the main body, this beneficially allows the desk to be collapsed into as slimline a volume as possible, assisting with the carrying and stowing of the portable desk.

Preferably, there may further comprise at least one support leg, the portable desk being supported at least in part by the or each support leg in the first configuration. The or each support leg may be pivotably engaged with the main body, and at least one of the main body and the or each support leg may also be telescopically extendible. If so, a telescopic main body release mechanism may be positioned in-line with an axle of the or each wheel.

By providing a main body which can be telescopically extended, the main body of the desk can be adjusted to suit the size of the user, whilst also being easily compactable into a small volume for transportation. Pivoting legs also allow a stable, freestanding desk to be assembled with the minimum of effort.

In a preferred embodiment, there may be two said support legs provided, a central support of the main body and the two said support legs forming a tripod in the first configuration.

A tripod is a simple yet sturdy structure which uses the fewest number of supporting pieces to ensure that the desk may be freestanding in its own right. Such an arrangement therefore only requires two support legs in addition to the main body, which may rest on the handle as a foot, to form the tripod. Optionally, the handle which doubles as a foot of the portable desk may be sufficiently sized and suitably flat to allow the additional support legs to be dispensed with whilst still allowing the desk to be freestanding.

Optionally, the support element may include at least one ground support member. The or each ground support member may be hollow or substantially hollow, the or each ground support member acting as a receptacle for objects on the work-surface of the support element.

If ground support members are affixed to the support element, then in the second, hand-cart configuration, the portable desk can easily rest on the wheels and ground support member or members so as to stand freely without the user needing to support it. This ensures that any luggage stowed on the desk in the second configuration is less likely to fall off due to the desk falling over.

There may be provided integrated lighting associated with the work-surface of the support element, a gripping portion on the work-surface of the support element, and/or a secondary support portion which is pivotably receivable within the work-surface of the support element.

There are a variety of potential improvements which could be incorporated into the work-surface of the support element to better assist with whatever task the user may intend. The gripping portion ensures that a laptop computer, for instance, does not just slide off the work-surface, and a support for a tablet computer is useful should the user not have a laptop computer, and lighting advantageously ensures that the user can work in low light.

According to a second aspect of the invention, there is provided a method of converting a portable desk according to the first aspect of the invention into a hand-cart, the method comprising the steps of: a] pivoting the support element so as to be perpendicular or substantially perpendicular to the main body; and b] inverting the main body such that the or each wheel is in contact with the ground, thereby presenting the support element for receiving luggage.

Preferably, the portable desk includes at least one support leg and, during step a], the or each leg is reoriented so as to be coplanar or substantially coplanar with a central support of the main body.

Additionally and alternatively, the portable desk may further comprise a seat element engagable with the main body, the seat element being reorientable so as to be parallel or substantially parallel with the main body.

According to a third aspect of the invention, there is provided a method of converting a portable desk according to the first aspect of the invention into a stowable volume, the method comprising the step of reorienting the support element so as to be parallel or substantially parallel with the main body.

Preferably, the portable desk includes at least one support leg which is reoriented so as to be coplanar or substantially coplanar with a central support of the main body. Furthermore, the portable desk may further comprise a seat element engagable with the main body, the seat element being reoriented so as to be parallel or substantially parallel with the main body.

By providing methods of converting the portable desk into a hand-cart and/or small, stowable object, it becomes far easier for an individual to work whilst out of the office or commuting.

The invention will now be more particularly described, by way of example only, with reference to the accompanying drawings, in which.

Figure 1:
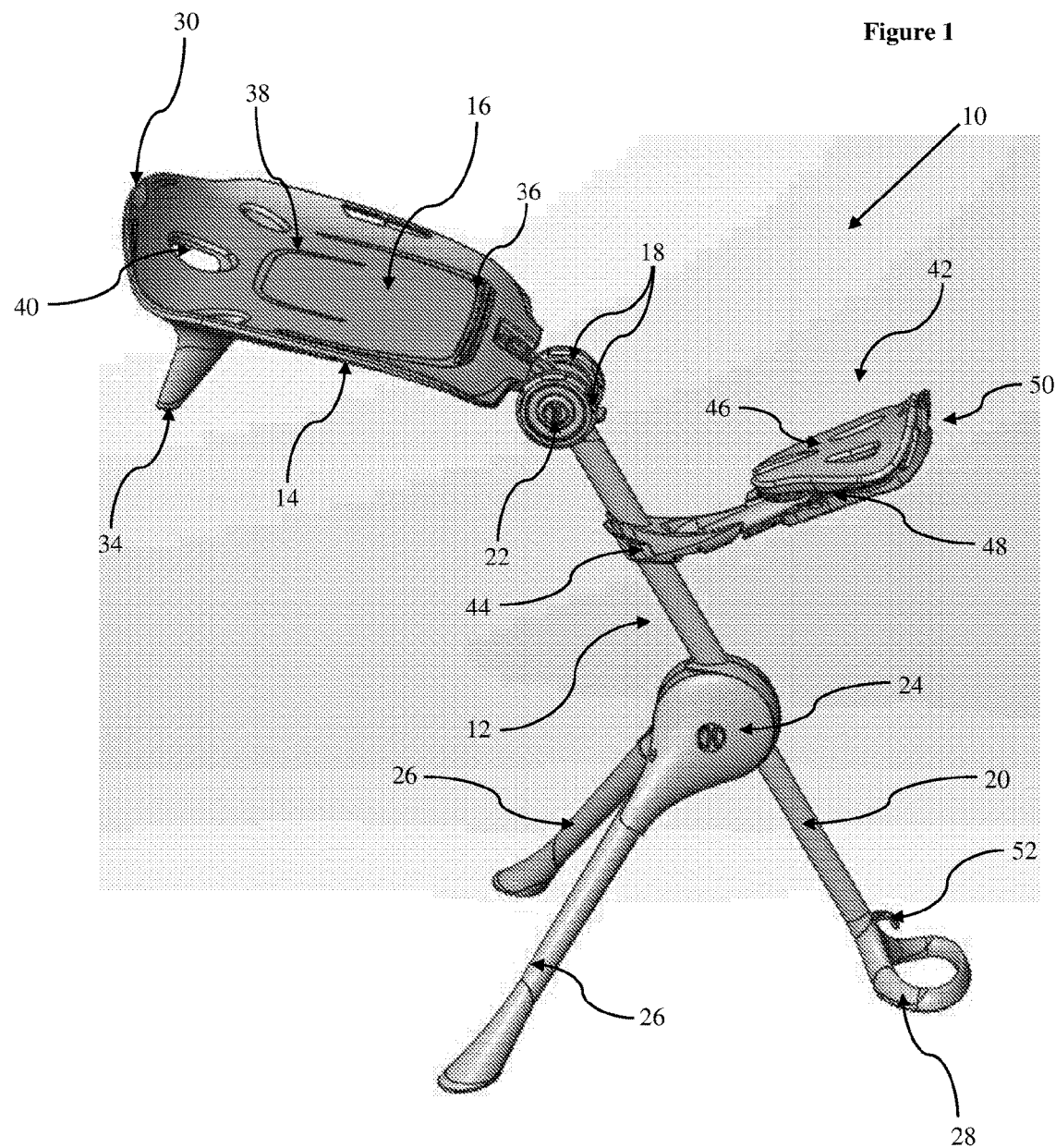
FIG. 1 shows a perspective representation of one embodiment of the portable desk in accordance with the first aspect of the invention, in a first erected configuration.

Referring firstly to FIG. 1, there is shown one embodiment of a portable desk, indicated globally at 10 in a standard first configuration, usable as a desk.

The portable desk 10 comprises a main body 12, a support element 14 which defines a work-surface 16 thereon, and at least one wheel 18. In this embodiment, two wheels 18 are illustrated, but these could readily be replaced with a larger multi-wheel axle or single castor wheel, and the present wheeled arrangement is purely illustrative.

In the depicted embodiment, the main body 12 comprises a central support 20 formed as a tube or strut which can be, preferably, telescopically extended and retracted. The central support is preferably a single element, but may be two or more elements.

The central support 20 is also preferably hollow, rectilinear and cylindrical or substantially cylindrical along at least a majority of its longitudinal extent. Although having a circular or substantially circular lateral cross-section, other non-circular cross-sections may be considered, such as quadrilateral or polygonal.

The wheels 18 are positioned at one end of the central support 20, and telescopic extension can be effected adjacent to the wheels 18; here a telescopic release mechanism may be activated via a button or catch 22 positioned on the axle of the wheels 18.

The main body 12 itself is preferably formed from a lightweight yet durable material, such as a plastics material, for example, a polycarbonate, or a metal such as aluminium. It will be appreciated that the main body 12 could be constructed from a number of suitable materials, however.

The central support 20 may be telescopic in this embodiment to allow the desk 10 to be adjusted for the height of a user. It will be appreciated that this is not strictly necessary, and different main body sizes could be provided for different users.

Attached to the central support 20 is a leg bracket 24 to which is engaged a pair of extendable legs 26. The legs 26 are pivotably engagable with the central support 20, and could conceivably also be telescopically extendible.

At an end of the central support 20 which is distal to the wheels 18 is provided a handle 28. In this embodiment, the hand is preferably ergonomically-shaped so as to be readily pulled or pushed by a user when the desk 10 is in a trolley or hand-cart configuration, but which also has the effect of acting as a third foot to stably position the main body 12 so as to be freestanding in the desk configuration.

The support element 14 is preferably formed as a tray having an upper surface which defines the work-surface 16, a rim 30 which bounds three sides of the work-surface 16, and a lower surface 32 from which projects at least one ground support member 34, two of which are provided in this embodiment. The ground support members 34 are beneficially moulded into the support element 14 so as to be preferably hollow or substantially hollow.

In the depicted embodiment, the support element 14 is in cantilevered engagement with the main body 12 at or adjacent to the wheels 18. This creates an optimal work-surface 16 area. However, it will be appreciated that this is only one way of affixing the support element 14 to the main body 12, for example, the support element 14 could be releasably engagable with the main body 12.

A gripping portion 36 is preferably provided on the work-surface 16 of the support element 14, and may beneficially be formed from a material with a relatively high coefficient of friction compared to the central support 20, for example, such as an elastomer. Furthermore, a secondary support portion 38 may preferably be provided which is pivotably receivable within the work-surface 16 of the support element 14, and can be used to stand, for instance, a tablet computer thereon. A cup-holder 40 could also be included, as shown, and lighting elements could feasibly be integrated therein as well.

The support element 14 may conveniently be in pivotable engagement with the central support 20 at or adjacent to the wheels 18 and at or adjacent to one of the perimeter edges of the tray, thereby enabling the support element to extend from the central support 20 of the main body 12 in a cantilevered extending fashion. In the embodiment shown in FIG. 1, the pivoting preferably occurs on the same axis as the axle of the wheels 18.

A seat element 42 is also provided engaged with the central support 20, as shown in FIG. 1, using a seat bracket 44. A vertical position of the seat element 42 on the central support 20 can be altered by adjustment of the seat bracket 44, which is, in the depicted embodiment, slidingly engagable with the central support 20. The seat bracket 44 may also be laterally adjustable to or away from the main body 12.

Figure 2:
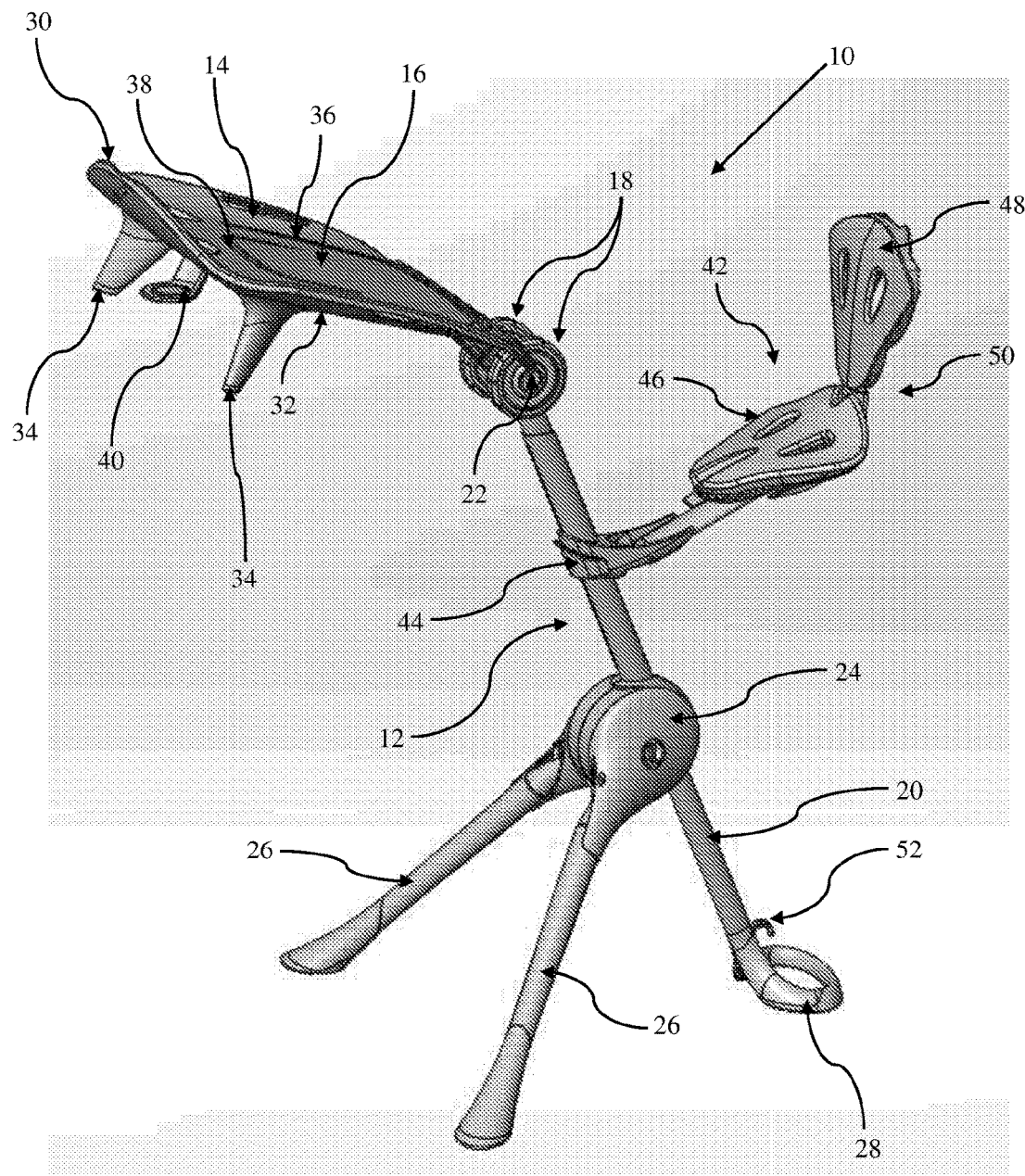
FIG. 2 shows a perspective representation of the portable desk of FIG. 1 in a second erected configuration.

The seat element 42 itself is preferably formed as a saddle to permit ready mounting thereof by a user, and the saddle may be ergonomically shaped so as to best receive the posterior of the user. An alternative arrangement of the seat element 12 is shown in FIG. 2.

The seat element 42 comprises upper and lower seat portions 46, 48 which are preferably pivotably engagable with one another. The upper seat portion 46 forms a squab of the seat element 42 in either arrangement, but, as shown in FIG. 2, the lower seat element 42, usually pivoted so as to engage with an underside of the upper seat portion 46, can be pivoted so as to vertically project from a rear portion 50 of the seat element 42. In such an arrangement, the lower seat portion 48 is able to act as a backrest to the squab defined by the upper seat portion 46.

To use the portable desk 10, a user can erect the main body 12 by pivoting the legs 26 relative to the central support 20 so as to form a tripod with the handle 28 attached to one end of the central support 20. This ensures that the main body 12 is freestanding and does not need to be held by the user.

The support element 14 can then be pivoted relative to the central support 20 such that the work-surface 16 is horizontal or at a slight incline thereto, with the work-surface 16 facing upwards. The support element 14 may then be used as a desk, the support element 14 being positioned at a vertically upper end portion of the main body 12 in this configuration. It will be appreciated that the support element 14 need not necessarily be the vertically uppermost component of the desk in this condition, but will preferably be at or adjacent to an uppermost end.

It will be clear that the portable desk 10 could at this point be used as a lectern, if desired, in which case the seat element 42 could be dispensed with. To ensure that the support element 14 stays in position correctly, there may be provided a locking means to prevent over- or under-pivoting of the support element 14 relative to the main body 12. This may be as simple as providing a block to pivoting beyond a certain angle, or may be an actual lock to retain the position of the support element 14.

Should the seat element 42 be required, as shown in FIGS. 1 and 2, then it can be pivoted such that the upper seat portion 46 is horizontal or at a slight incline thereto, whereby the desk 10 forms a first erected condition, as shown in FIG. 1, to allow a user to sit at the desk 10 and utilise the work-surface 16 for whatever task they may desire, adjusting the vertical position of the seat bracket 44 as necessary. The support element 14 will typically be sized so as to accommodate a standard laptop computer or tablet computing device thereon, by way of example. To increase user comfort, or improve user posture, the lower seat portion 48 may be pivoted into the backrest configuration, whereby the desk 10 forms a second erected condition, as shown in FIG. 2.

Should the user be wearing a coat or jacket, then a hook may be provided on the rear portion 50 of the seat element 42 from which such a coat may be hung. The user may also utilise the cup-holder 40 as a beverage receptacle, illuminate their workspace using the lighting, or keep items such as a phone, keys or stationary in the hollow ground support members 34.

The first and second, desk-use erected configurations can therefore be utilised by a user wishing to work in a location where there may be no other seating and/or workspace, such as a train station, conference centre or airport.

Figure 3:
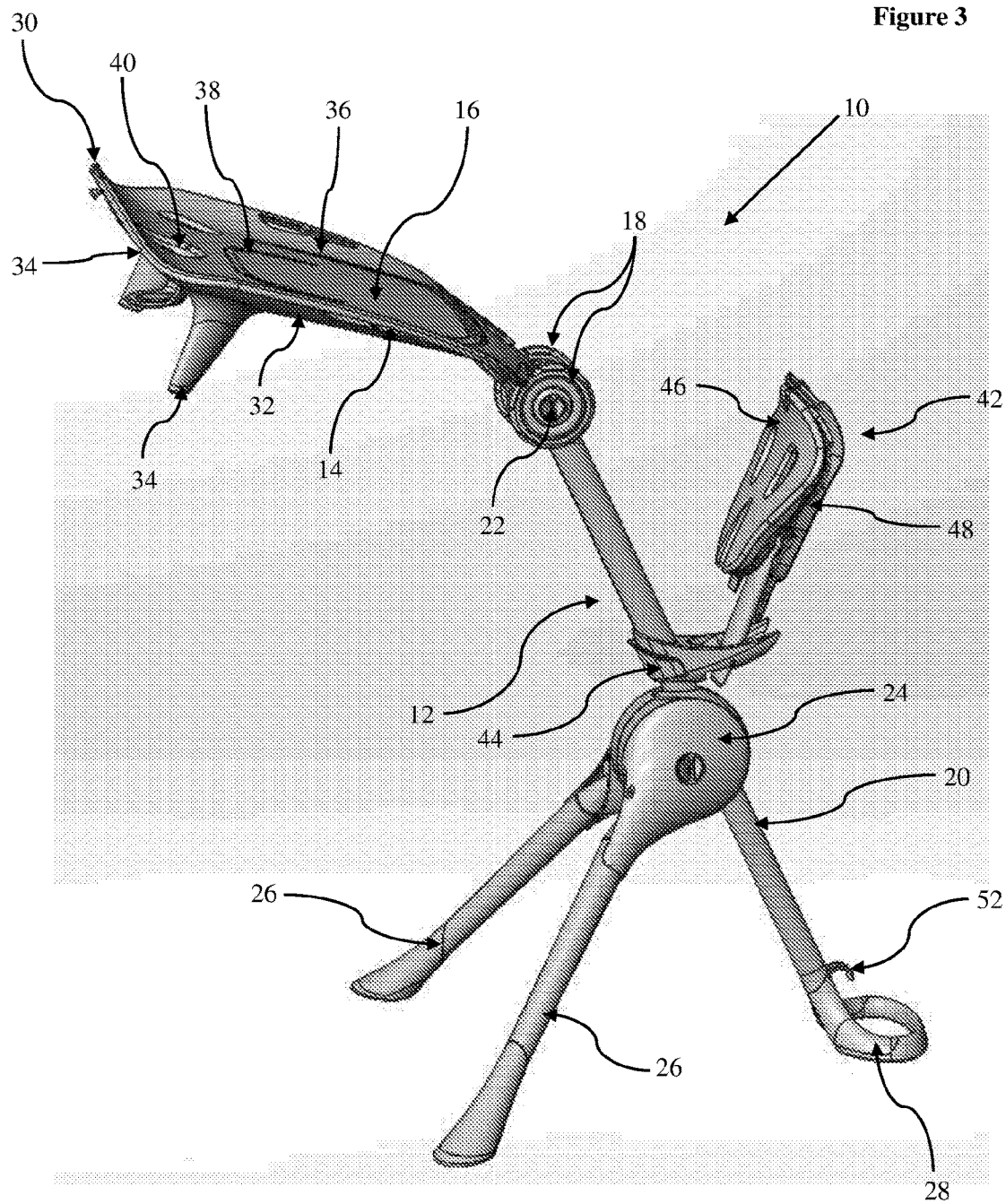
FIG. 3 shows a perspective representation of the portable desk of FIG. 1 in a first intermediate condition, between the aforementioned first and second erected configurations and a collapsed storage configuration.
Figure 4:
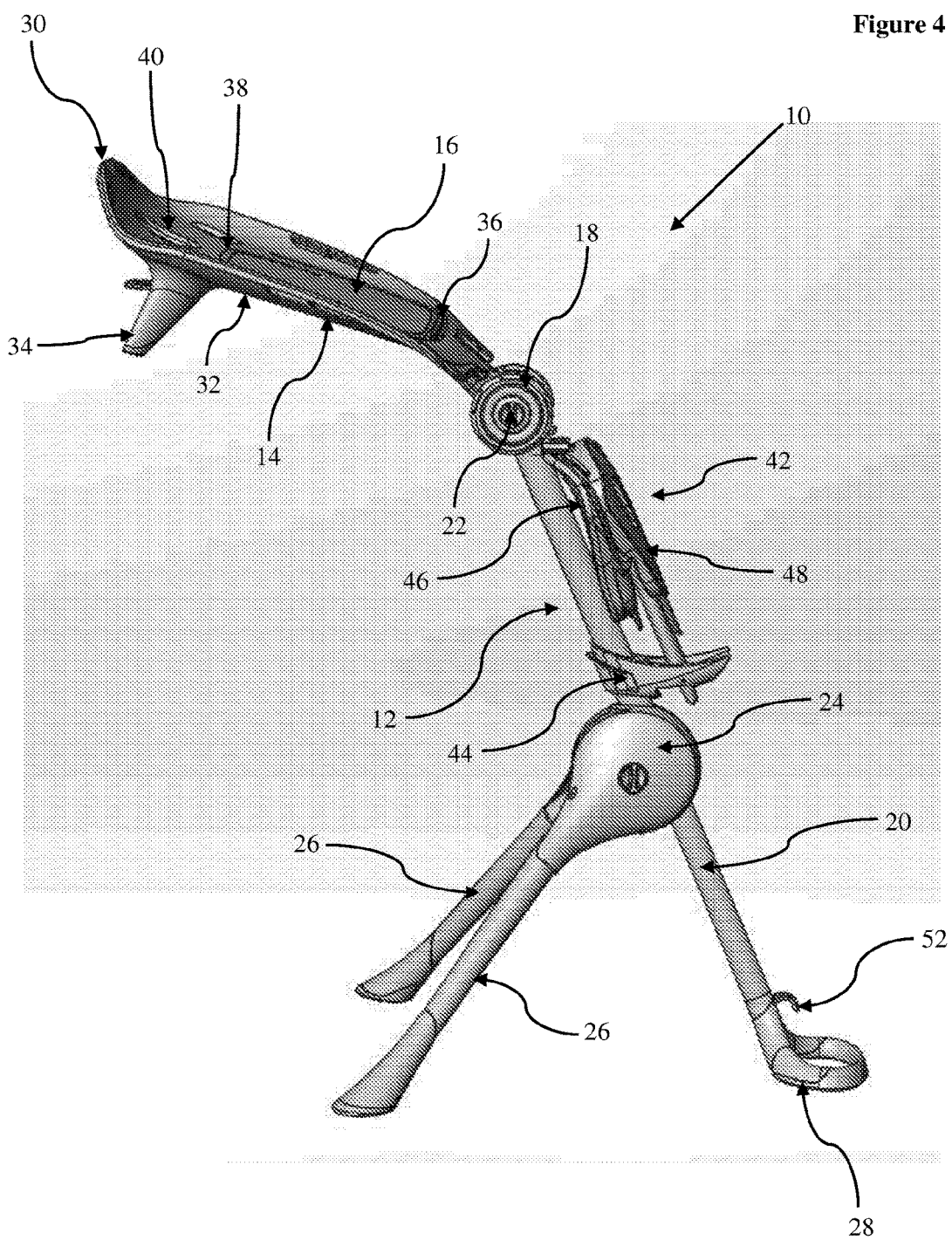
FIG. 4 shows a perspective representation of the portable desk of FIG. 1 in a second intermediate condition which is more compact than the first intermediate condition shown in FIG. 3.

Once the user needs to move onwards, the desk 10 can be readily reconfigured for transportation, as can be seen in FIGS. 3 to 6, sequentially. Firstly, and as illustrated in FIG. 3, the seat bracket 44 is adjusted so as to sit adjacent to the leg bracket 24, thereby forming a first intermediate condition, and the seat element 42 is pivoted towards the central support 20 so as to lie parallel or substantially parallel with the central support 20, thereby forming a second intermediate condition as shown in FIG. 4. The main body 12 of the depicted embodiment has been sized such that the seat element 42 in this stowed condition does not collide with the wheels 18, but fits neatly thereunder.

Figure 5:
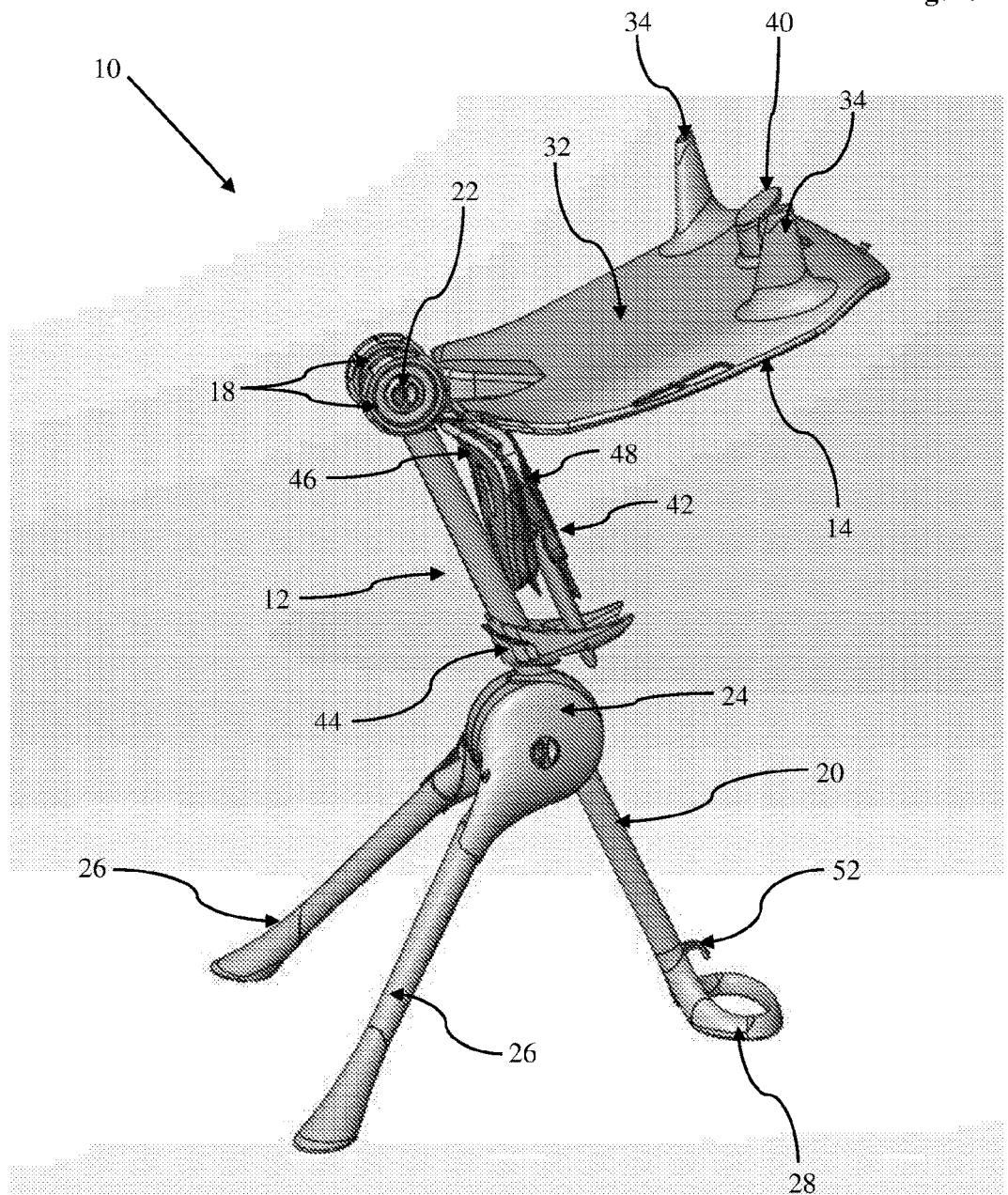
FIG. 5 shows a perspective representation of the portable desk of FIG. 1 in a third intermediate condition in which a support element is reoriented relative to the second intermediate condition shown in FIG. 4.

Once the seat element 42 is stowed, the support element 14 can be pivoted towards the seat element 42 until it is substantially perpendicular to the central support 20 such that the lower surface 32 of the support element 14 is oriented in an upward direction. This pivoting of the support element 14 now exposes the wheels 18, whereby the desk 10 forms a third intermediate condition as seen in FIG. 5.

To complete the conversion of the desk 10 into a compact hand-cart condition, the legs 26 are pivoted towards the wheels 18 until the legs 26 become coplanar or substantially coplanar with the central support 20. The desk 10 can then be rotated or inverted such that the wheels 18 come into contact with the ground.

Figure 6:
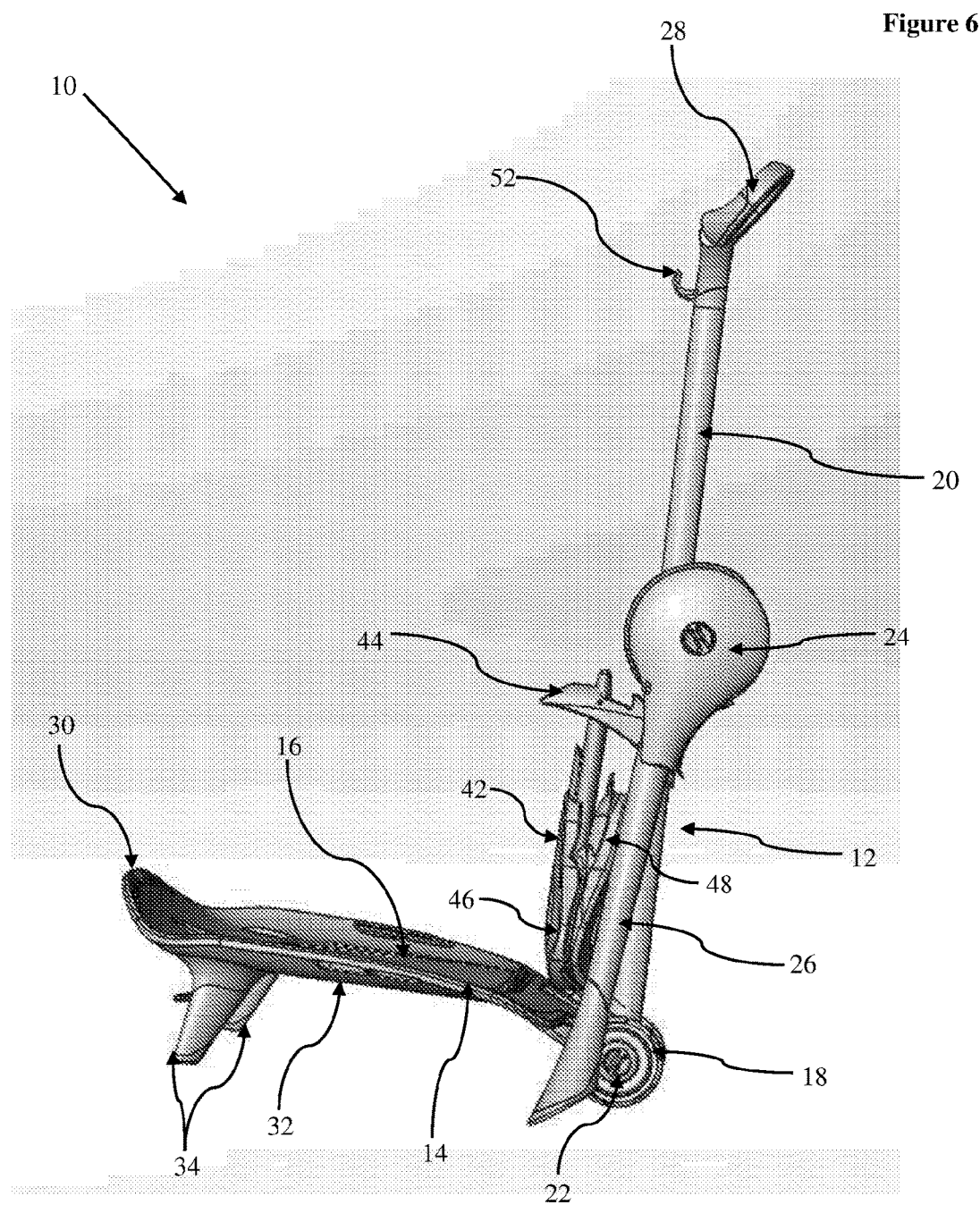
FIG. 6 shows a side view of the portable desk of FIG. 1 in a compact hand-cart condition, inverted relative to the third intermediate condition shown in FIG. 4 and with support legs retracted.
Figure 7:
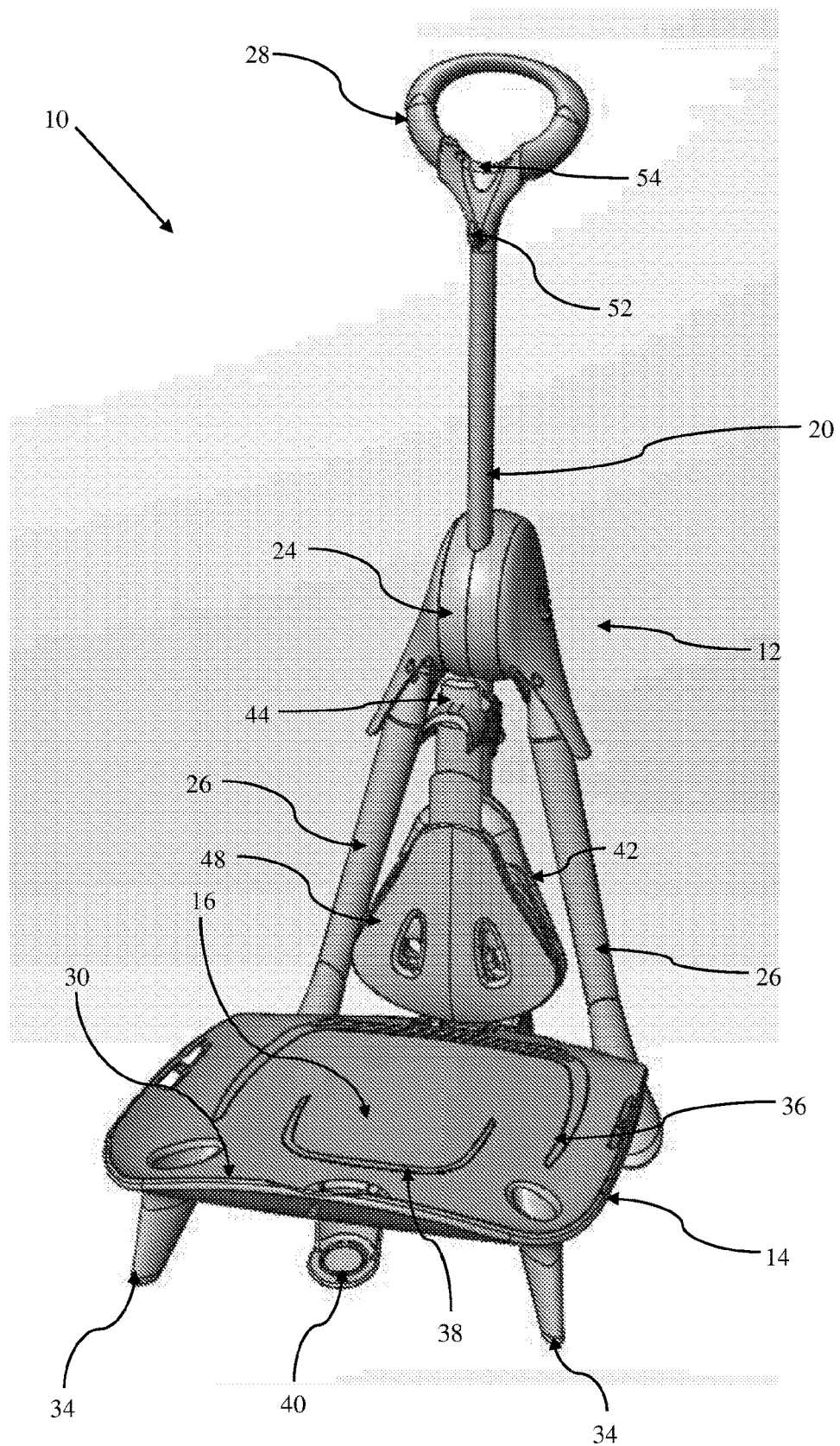
FIG. 7 shows a perspective representation of the portable desk, shown in FIG. 6 and configured as the compact hand-cart.

As shown in FIGS. 6 and 7, this results in a trolley configuration which, when stationary, is freestanding, being supported by the wheels 18 and the ground support members 34. As the work-surface 16 of the support element 14 is now upward-facing once more, the user is able to stow or place luggage thereon, and pull or push the desk 10 using the handle 28, allowing it to move on the wheels 18. As illustrated, a further hook 52 may be provided adjacent to the handle 28 to allow the user to hang a coat or jacket in this trolley/hand-cart configuration whilst they travel.

This method of obtaining the compact hand-cart condition can be considered to be achievable by providing the portable desk 10 having the main body 12 including the central support 20 and at least one leg 26 engaged or engagable with the central support 20; the main body 12 being arranged such that the portable desk 10 can be positioned to be freestanding, at least with said one wheel 18 engaged or engagable with the central support 20; and the support element 14, having a usable work-surface 16 thereon, being preferably pivotably engaged or engagable with the central support 20. Pivoting the support element 14 so as to be perpendicular or substantially perpendicular to the central support 20; pivoting the or each leg 26 so as to be coplanar or substantially coplanar with the central support 20; and finally re-orienting or inverting the partially collapsed portable desk 10 such that the or each wheel 18 is in contact with the ground.

Figure 8:
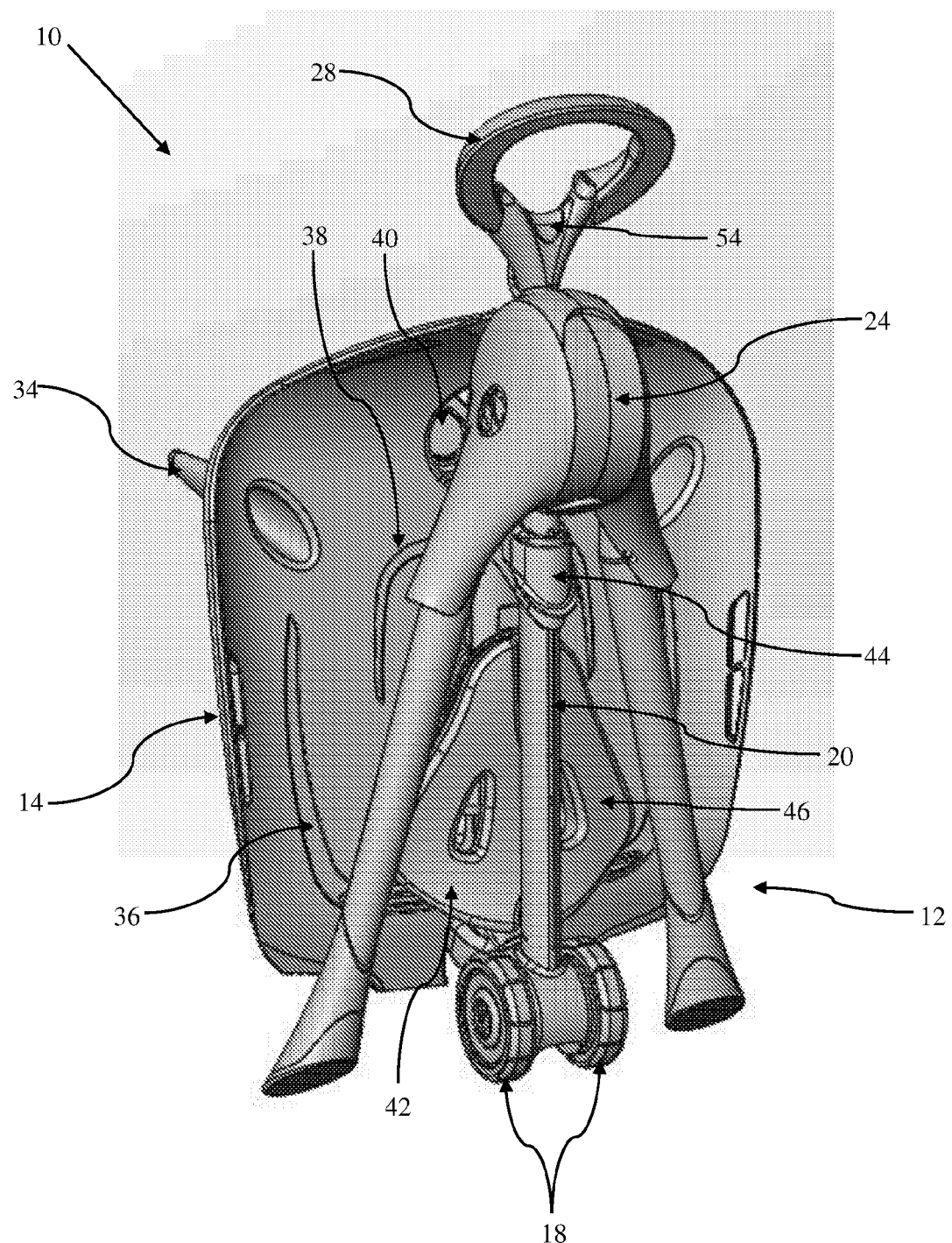
FIG. 8 shows a perspective representation of the portable desk of FIG. 1 in the collapsed storage configuration.

Whilst the trolley or hand-cart configuration is useful for the transport of luggage, it may still be a relatively cumbersome item. There is therefore provided a collapsed storage configuration which is suitable for stowing the desk 10, for example, in a hand luggage compartment of a train or aircraft. This configuration is shown in FIG. 8.

A catch or button 54 may be provided, as illustrated, in connection with the handle 28 and which allows the central support 20 to be further retracted, such that the handle 28 can be preferably recessed close to the leg bracket 24. Furthermore, the support element 14 may be further pivoted such that the work-surface 16 sits or lies adjacent to the stowed seat element 42, with the support element 14 lying parallel or substantially parallel with the central support 20.

This collapsed storage configuration has a substantially reduced volume when compared with either of the first and second erected configurations, shown in FIGS. 1 and 2, and is approximately the size of a briefcase, allowing the desk 10 to be readily carried by the handle 28 and stowed into small volumes.

This method of obtaining a stowable configuration can be considered to be achievable using the portable desk 10 as defined above, whereby the support element 14 is repositioned, in this case pivoted, so as to be parallel or substantially parallel with the central support 20; and the or each leg 26 is repositioned, again in this case pivoted, so as to be coplanar or substantially coplanar with the central support 20.

Whilst the above-described embodiment utilises moving components which are, for the most part, pivotable, it will be appreciated that there are alternative means of effecting relative motion of parts available to the skilled person. By way of example only, it is envisaged that a modular desk can be constructed in which the support element is releasably engagable with the main body in a plurality of different fixed positions. In such a scenario, the support element would not be pivoted about an axis of rotation but physically dislocated or removed from the main body and then reattached in, for example, a stowed condition. Various means for attaining the configurability of the desk are available, and the above embodiment is merely illustrative in this regard.

Similarly, and as intimated previously, the desk need not necessarily be size-adjustable, but could be formed so as to accommodate a user of standard dimensions, for instance, by providing large, medium and small models.

It will also be appreciated that, although it may be easiest to stow the legs of the main body so as to be coplanar with the main body in the trolley and/or stowed configurations, it may be possible to stow them in an alternative manner. For instance, the legs could be telescopically retractable into the main body, or in the trolley configuration, the legs could be positioned so as to be coplanar with the support element instead.

It is therefore possible to provide a portable desk which has a main body, at least one wheel, and a support element attached to the main body at or adjacent to the or each wheel, such that the desk can either be used as a freestanding desk, with the support element defining a work-surface thereon, or is readily transportable in a different configuration by pushing or pulling the desk on its wheels. Advantageously, the support element can also double as a hand-cart thereby providing a luggage-carrying platform in this further configuration, ensuring that the individual is not overburdened when travelling with the portable desk.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention herein described and defined.

The invention claimed is:

1. A portable desk, comprising:
   a main body;
   at least one wheel which engages with the main body; and
   a support element having a user work-surface and which engages with an end portion of the main body which is at or adjacent to the at least one wheel, the support element being pivotable relative to the main body;
   wherein, in a first configuration, the main body is arranged such that the support element is disposed at or adjacent to an upper end portion of the main body thereby presenting the work-surface for use by a user, and in a second configuration, the main body is inverted such that the at least one wheel is in contact with the ground to allow the desk to be pushed or pulled by a user.

2. A portable desk as claimed in claim 1, further comprising a locking device to lock a pivoted position of the support element relative to the main body.

3. A portable desk as claimed in claim 1, wherein, in the second configuration, the support element is perpendicular or substantially perpendicular to the main body, the portable desk forming a hand-cart when inverted.

4. A portable desk as claimed in claim 1, wherein the support element is cantilevered to the main body.

5. A portable desk as claimed in claim 1, further comprising a seat element engagable with the main body.

6. A portable desk as claimed in claim 5, further comprising a bracket connecting the seat element to the main body, the bracket being arranged to allow a distance between the seat element and main body to be adjusted.

7. A portable desk as claimed in claim 5, wherein the seat element comprises upper and lower seat portions, the lower seat portion being arranged relative to the upper seat portion to provide a back rest when unfolded, with the upper seat portion thereby forming a squab.

8. A portable desk as claimed in claim 7, wherein the upper and lower seat portions pivotably engage relative to one another.

9. A portable desk as claimed claim 1, further comprising a handle which engages with the main body and is positioned distal to the at least one wheel.

10. A portable desk as claimed in claim 9, wherein the handle forms a leg or foot of the main body in the first configuration.

11. A portable desk as claimed in claim 9, further comprising a third configuration in which the support element is oriented to be parallel or substantially parallel with the main body allowing the desk to be carried by the handle.

12. A portable desk as claimed in claim 1, further comprising at least one support leg which extends from the main body, the portable desk being supported at least in part by the at least one support leg in the first configuration.

13. A portable desk as claimed in claim 12, wherein at least one of the main body and the at least one support leg is adapted to telescopically extend.

14. A portable desk as claimed in claim 12, wherein there are two said support legs, a central support of the main body and the two said support legs forming a tripod in the first configuration.

15. A portable desk as claimed in claim 1, wherein the support element includes at least one ground support member.

16. A portable desk as claimed in claim 15, wherein the at least one ground support member is at least in part hollow, the at least one ground support member acting as a receptacle for objects on the work-surface of the support element.

17. A portable desk as claimed in claim 1, further comprising a secondary support portion which is pivotably received within the work-surface of the support element.

18. A method of converting a portable desk as claimed in claim 1 into a hand-cart, the method comprising the steps of:
   a] pivoting the support element so as to be perpendicular or substantially perpendicular to the main body; and
   b] inverting the main body such that the at least one wheel is in contact with the ground, thereby presenting the support element for receiving luggage.

19. A method of converting a portable desk as claimed in claim 1 into a stowable volume, the method comprising the step of reorienting the support element so as to be parallel or substantially parallel with the main body.

* * * * *